No. 830,676. PATENTED SEPT. 11, 1906.
H. B. RUGGLES.
AUTOMATIC WEIGHER AND REGISTER.
APPLICATION FILED AUG. 25, 1904.
2 SHEETS—SHEET 1.
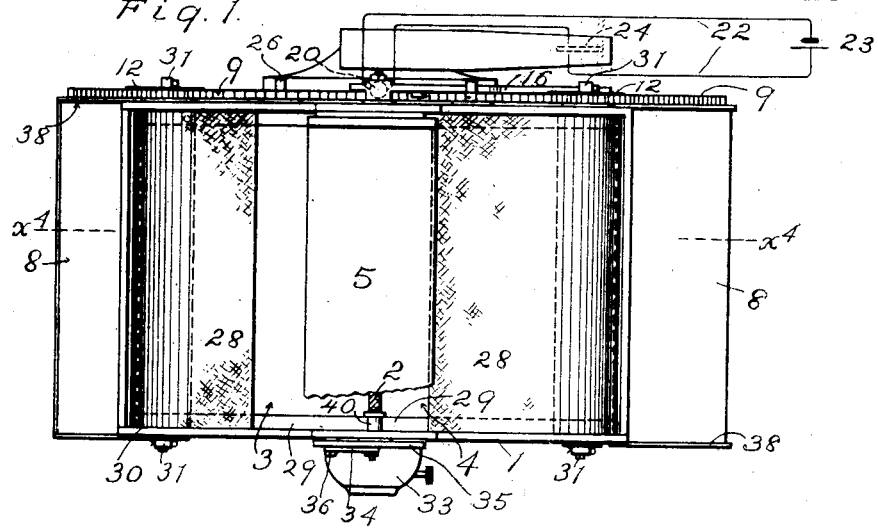
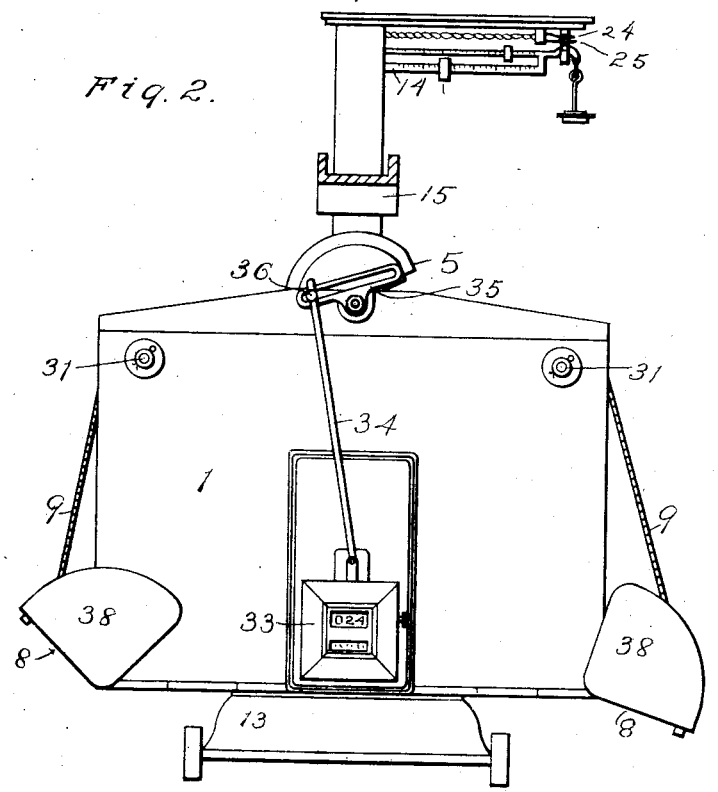
Witnesses:
Inventor:
Henry B. Ruggles
by Townsend Bros
His Atty's No. 830,676. PATENTED SEPT. 11, 1906.
H. B. RUGGLES.
AUTOMATIC WEIGHER AND REGISTER.
APPLICATION FILED AUG. 25, 1904.
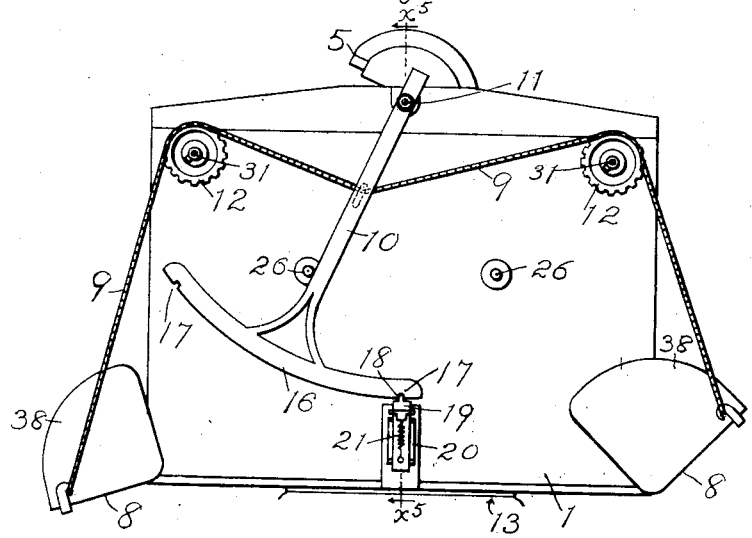
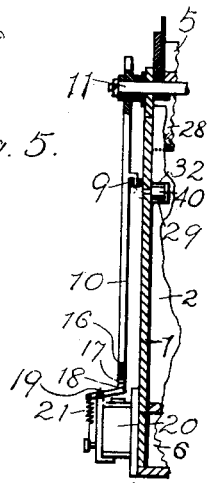
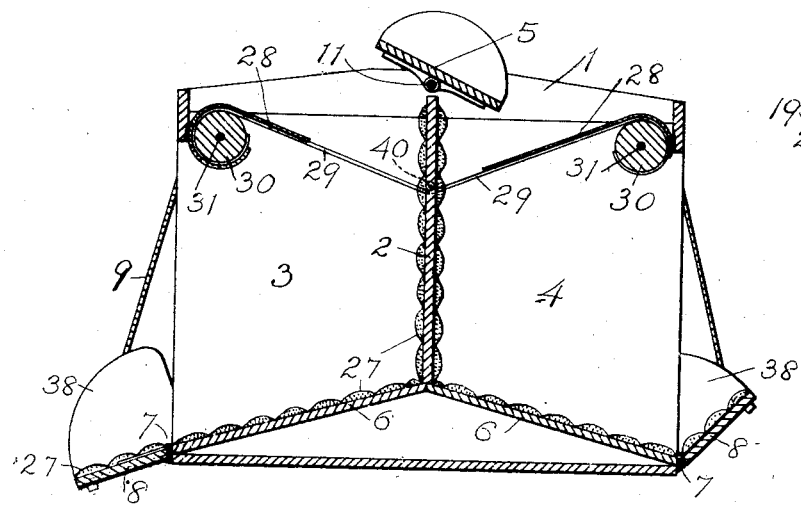
Witnesses:
Inventor:
Henry B. Ruggles
by Townsend Bros
His Attys

UNITED STATES PATENT OFFICE.

HENRY B. RUGGLES, OF REDLANDS, CALIFORNIA.

AUTOMATIC WEIGHER AND REGISTER.

No. 830,676.

Specification of Letters Patent.

Patented Sept. 11, 1906.

Application filed August 25, 1904. Serial No. 222,104.

*To all whom it may concern:*

Be it known that I, HENRY B. RUGGLES, a citizen of the United States, residing at Redlands, in the county of San Bernardino and State of California, have invented a new and useful Automatic Weigher and Register, of which the following is a specification.

The main object of the invention is to provide means suitable for use in conjunction with an ordinary weighing-scale to automatically weigh articles, such as fruit, &c.

A further object of the invention is to enable such weighing to be effected continuously—that is to say, with an uninterrupted supply and delivery.

Another object of the invention is to provide for continuous registering of the weight of fruit weighed and delivered.

The accompanying drawings illustrate the invention.

Figure 1 is a plan, partly broken away. Fig. 2 is a front view of the device in position on the scale. Fig. 3 is a rear view. Fig. 4 is a vertical section on line $x^4 x^4$ in Fig. 1. Fig. 5 is a fragmentary section on line $x^5 x^5$, Fig. 3.

The device comprises a case or receptacle 1, preferably divided by a central partition or wall 2 to form two bins or compartments 3 4. A tilting tray or deflector 5 is pivotally mounted at the top of partition 2, so as to direct the fruit to one or the other of the bins 3 4, according to the direction in which said tray is tipped. The floor 6 of each bin 3 4 inclines from the partition to its outer edge, and at said edge is hinged or pivoted at 7 a flap or retainer 8, which serves when raised to arrest the fruit as it rolls down said floor or when lowered to release the fruit, as hereinafter described. Said retainers are desirably provided with side wings 38 at each end.

Means are provided operated by the weight of the fruit to reversely operate the retainers 8 and at the same time to tilt the deflector 5, said means consisting, for example, of a chain or flexible connection 9, connected at its ends to the respective hinged retainers 8 and at its middle to an arm 10 on a rock-shaft 11, carrying the deflector 5, so that the weight of the fruit pressing against a retainer will tend to raise the other retainer and tilt the deflector. The operating-chain 9 may pass over pulleys or sprockets 12.

The device is adapted for use with any ordinary weighing-scale—for example, a scale such as shown in Figs. 1 and 2, where 13 designates the scale-platform on which the case 1 is placed, and 14 designates the scale-beam. Suitable delivery means, such as a spout 15, is provided for feeding fruit continuously to the weigher, said delivery means extending over the tilting tray, so that all of the fruit will be delivered onto said tray.

The operating means for retainers 8 and deflector 5 is controlled by a locking device comprising a segment-bar 16 on the arm 10, having notches 17 engaged by a lug 18 on the armature 19 of an electromagnet 20, which is fixed to one side of the case 1, said armature having a retracting-spring 21, that normally holds said lug in engagement with the segment 16.

An electric circuit 22, energized by a battery 23, is connected to said magnet and to contacts 24 25, which are placed over the scale-beam 14 in position to be engaged thereby when the beam rises, so as to close the circuit and energize the magnet 20.

There is a notch 17 near each end of segment 16, and the lug engages these notches alternately as the arm 10 swings one side or the other. Stops 26 may be provided to limit the movement of the arm 10 and prevent excessive jar on the armature.

In connection with the above-described mechanism I prefer to use a dasher or obstructing means to temporarily check or retard the fruit in its passage into the bins, so that undue jarring and bruising of the fruit will be avoided. For this purpose an apron or canvas sheet 28 is supported in the upper portion of each bin and is desirably movable, being, for example, attached to straps 29, mounted to wind on rollers 30, carried by shafts 31, said straps passing under rollers 40 and through slots 32 in the partition 2 and winding off of one roller 30 as they wind on the other, so that as one apron 28 is drawn down toward the partition 2 the other apron will be withdrawn therefrom. Said aprons are desirably inclined inwardly toward the partition, so that the fruit will run down the apron and through the slot or opening between the apron and the partition. The movement of the aprons should be simultaneous with the movement of the deflector and may be effected by mounting the sprockets 12 for the chain 9 directly on the shafts 31 of rollers 30, so that as the chain operates to tilt the deflector to one side it will draw in the apron at that side toward the partition and will withdraw the apron at the other side.

The floors of the bins 3 4 and other parts receiving the impact of the fruit are desirably padded or cushioned, as shown at 27.

The registering means may consist of a register or counter 33 of any suitable kind, whose operating-bar 34 is connected to be moved once for each tilting movement of the deflector 5. For this purpose a slotted lever 35 may be connected to said bar, the bar 34 having a roll or pin 36 engaging in the slot in said lever, so that as the lever tilts to one side it will first lift the bar bodily and then when the lever 35 is sufficiently tilted the pin or roll 36 will slide or roll across to the other end of the slot, thereby giving a complete reciprocation to the bar 34 and operating the counter once.

The operation is as follows: The weights of the scale are adjusted for the tare—for example, by adjustment of lower weight 37—and then for the weight of fruit which is to be measured at each operation, as by adjustment of the upper weight 39. Fruit is allowed to run from the spout 15 to the deflector 5 in a substantially continuous manner, and assuming the parts to be in position shown in Fig. 4 the fruit will be deflected to the right and will fall on the dasher or apron 28 on that side, rolling therefrom through the space between said apron and the partition and then running down the inclined floor of the compartment 4 and coming to rest against retainer 8. The apron 28 is sufficiently close to partition 2 to cause the fruit to fall into the bins separately or a few at a time. When the fruit so accumulated on that side has reached the amount for which the scale is set, the beam will rise, closing contact at 24 25, causing magnet 20 to be energized and the armature 19 to release the detent-arm 10. The weight of fruit pressing on the retainer 8 on that side will then pull the chain 9 over to that side, thereby tilting the deflector 5 to the other side and raising the retainer 8 on said other side to arrest the fruit as it falls thereon. Meanwhile the first-named retainer 8 will have dropped to position to allow the fruit to run out of the bin 4, and the apron 28 in said bin will have been pulled away from the partition 2, so that any fruit that may have been held on said apron by clogging or arching of the fruit thereon will be discharged into the bin 4 and will roll out along with the rest. The function of these aprons when in position nearest the wall 2 is to hold back the fruit and cause it to pass easily and gently into the bins. There is, however, a possibility of the fruit clogging or arching up at the outlet between the apron and said wall, and therefore after the completion of each weighing operation the apron is withdrawn from the wall sufficiently to permit any fruit that may have accumulated in this manner to drop into the bin below and roll out over the open retainer.

When it is desired to use the scale for other purposes, the case 1 can be removed bodily therefrom, the electric connections being detached, if desired.

While I have shown and described the preferred embodiment of my invention, various changes may be made therein without departing from the spirit of my invention.

What I claim is—

1. An automatic weigher comprising a bin, open at one end, a deflector at the top of the bin to direct material thereinto, a retainer hinged at the open end of the bin and extending, when in closed position, upwardly from its hinge to temporarily hold material in the bin, means connected to said retainer operated by the material pressing thereagainst and connected to operate the deflector, a weighing-scale supporting said bin, a lock for the retainer and deflector, and connecting means for controlling said lock operated by the movement of the scale.

2. An automatic weigher comprising a case having open-ended bins, a tilting deflector to direct the material alternately to said bins, said bins having their floors inclined downwardly toward their open ends, retainers hinged at the lower ends of said floors and extending, when in closed position, upwardly from their hinges to temporarily hold the material in the bins, means connected to said retainers and to the deflector to enable the operation of each retainer by material resting thereon to operate the deflector and the other retainer, a weighing-scale supporting said case and provided with contact means operated by the movement of the scale, a lock for the retainer and deflector-operating means, and electromagnetic controlling means therefor connected to be operated by said contacts 3. In an automatic weigher, two bins open at their outer ends, retainers hinged at the outer end of each bin, each retainer swinging from the position wherein it extends upwardly to arrest the movement of material from the bin to the position where it extends downward from its hinge to permit such movement, and a connection between the retainers to cause each retainer to be raised by the depression of the other retainer due to the material resting thereagainst.

4. In an automatic weigher, two open-ended bins, hinged retainers at the open end of each bin to arrest the movement of material from the bin, a deflector over the bins and a flexible connection between the retainers to cause each retainer to be raised by depression of the other retainer due to material resting thereagainst, and an arm engaging said flexible connection and connected to the deflector to direct it toward the bin whose retainer is raised.

5. The combination of two bins having an intervening partition, a movable deflector over the bins, means for operating the deflector to direct it toward either of the bins, aprons in the respective bins inclined toward but separated from said partition, flexible supporting and connecting means for said aprons, rollers on which said aprons and connecting means are wound and a flexible operating connection connected to the tilting deflector and to said rollers to reversely operate said aprons and simultaneously operate the deflector.

In testimony whereof I have hereunto set my hand, at Los Angeles, California, this 20th day of August, 1904.

HENRY B. RUGGLES.

In presence of—
ARTHUR P. KNIGHT,
JULIA TOWNSEND.